(12) United States Patent
Pfau et al.

(10) Patent No.: US 6,657,730 B2
(45) Date of Patent: Dec. 2, 2003

(54) INTERFEROMETER WITH ANGLED BEAM ENTRY

(76) Inventors: Tilman Pfau, Waldburgstr. 28, DE-71082, Böblingen (DE); Yuri Ovchinnikov, Karlstr. 19/2, 70771 Leinfelden-Echterdingen (DE)

( * ) Notice: Subject to any disclaimer, the term of this patent is extended or adjusted under 35 U.S.C. 154(b) by 0 days.

(21) Appl. No.: 10/038,736

(22) Filed: Jan. 3, 2002

(65) Prior Publication Data

US 2002/0159068 A1 Oct. 31, 2002

(30) Foreign Application Priority Data

Jan. 4, 2001 (EP) .......................................... 01100027

(51) Int. Cl.⁷ ................................................ G01B 9/02
(52) U.S. Cl. ...................................................... 356/477
(58) Field of Search ................................ 356/477, 479, 356/480, 481; 250/227.19, 227.27; 385/12

(56) References Cited

U.S. PATENT DOCUMENTS

| | | | |
|---|---|---|---|
| 4,324,492 A | * 4/1982 | Drenckhan et al. | ......... 356/450 |
| 4,381,137 A | 4/1983 | Berg et al. | ............... 350/96.18 |
| 4,504,121 A | 3/1985 | Carlsen et al. | ............... 350/385 |
| 4,863,270 A | * 9/1989 | Spillman, Jr. | ............... 356/477 |
| 5,094,517 A | * 3/1992 | Franke | ......................... 385/12 |

FOREIGN PATENT DOCUMENTS

EP 01 100027.0 1/2001

OTHER PUBLICATIONS

Eckerle, et al., *Experimental Mode Coupling Analysis in Optical Waveguides for Sensor and Component Optimization*, Optics & Laser Technology, vol. 28, No. 5, pp. 373–380 (1996).

* cited by examiner

Primary Examiner—Frank G. Font
Assistant Examiner—Michael A. Lyons
(74) Attorney, Agent, or Firm—Duane Morris LLP

(57) ABSTRACT

An interferometer has an angled beam entry to a multimode waveguide that can be formed of parallel plane mirrors. The beam is input at a specified primary angle $\alpha$ so as to generate interference between populated modes. The primary angle preferably satisfies the condition $\alpha > \arcsin(\lambda/d)$, where d is a width of the waveguide and $\lambda$ is a wavelength of the primary beam. The interferometer can provide a small distance between transmission fringes and is useful for precise position measurements. The fringe positions are determined by wavelength, which permits use in spectrum analysis and the like. The waveguide can include an active optical material and be controlled, for example for switching between output channels.

23 Claims, 7 Drawing Sheets

INTERFEROMETER WITH ANGLED BEAM ENTRY

BACKGROUND OF THE INVENTION

The present invention relates to an interferometer, in particular to an interferometer used for determining a wavelength of light, an absolute distance, a relative displacement and/or a refractive index and/or used for switching optical signals and/or used as a wavelength selective cross-connect and/or used for analysing particle or atomic beams, preferably of electrons, protons, neutrons or atoms, in view of determining e.g. an acceleration and/or rotation thereof and/or used for analysing or determining the surface properties of a substrate such as its flatness.

It is known to analyse light by means of interferometers such as the Michelson interferometer, the Fabry-Perot interferometer and to measure the refractive index by means of interferometers such as the Jasmin interferometer. Moreover, it is known to use diffraction gratings for the wavelength-division multiplexing and demultiplexing. Furthermore, it is known to analyze particle beams e.g. by means of mass spectrometers or the Mach-Zehnder interferometer.

However, the above standard interferometers do not provide information about the absolute distance and the accuracy of the measurement of relative displacements and of the refractive index is limited by the distance between the next fringes of the interferometer, which can not be smaller than one half of the light wavelength. Moreover, the standard wavemeters based on the Michelson interferometer cannot be compact.

Thus, it is an object to provide an improved interferometer, which can be compact and allows for measurements with an improved accuracy.

BRIEF SUMMARY OF THE INVENTION

According to the invention, there is provided an interferometer or switch or refractometer or spectrum analyser or spectrum separator or optical signal multiplexer/demultiplexer or spectrometer comprising:

- at least one multimode waveguide or a waveguide having a plurality of modes which can be populated,
- (light or matter) beam or wave input means, preferably light input means, for inputting a primary (light or matter) beam or wave, preferably a preferably collimated primary light beam or ray, under a specified (predetermined or predeterminable) primary angle $\alpha$ into the multimode waveguide so as to generate an interference between two or more populated modes of the multimode waveguide, and
- at least one (light or matter) beam or wave processing or analysing or outputting means, preferably at least one light processing or analysing or outputting means, for processing or analysing or outputting one or more secondary (light or matter) beams or waves, preferably light beams or rays, exiting the multimode waveguide.

Accordingly, the interference occurs between two modes (high and/or low modes) of the multimode waveguide having two or more propagated modes. Thus, a preferably monochromatic light or primary light beam and/or matter (particle or atomic) beam (e.g. an electron, proton and/or neutron beam or an atomic beam of preferably ionized atoms) is or can be inputted into the multimode waveguide at an angle $\alpha$, preferably at some macroscopic angle $\alpha$. Accordingly, the intensity of the secondary (light or matter) beam or light beam, in particular the intensity of the two secondary matter beams or light beams, going out of or exiting or leaving the waveguide experience a (semi- or quasi-) periodic modulation as a function of the total (optical) pass of the waveguide. The (semi- or quasi-) periodic oscillation of the beam or light intensity in the secondary (matter or light) beam can be explained by the interference between the few populated high modes of the multimode waveguide. In particular, the preferably monochromatic light or monoenergetic matter beam enters the multimode waveguide at some preferably macroscopic angle, when only a few high modes of the waveguide are populated. The beatings between these modes leads to the (semi- or quasi-) periodic oscillations of the intensity particularly in the two (light) beams going out of the waveguide at opposite angles. Due to this specific modulation, the distance between the fringes of such an interferometer can be much smaller than in all standard existing interferometers. Moreover, for preferably large effective length of the waveguide these interference fringes are very sensitive to small variations of the (optical) width and length of the waveguide and also to the wavelength of light or energy of the matter beam. Very small differences between the fringes of the interferometer can be observed, in particular fringes with period of about $\lambda/9$ were already experimentally observed, and allow for an improved resolution of the interferometer in space and frequency of light or energy of the beam.

Thus, the interferometer according to the invention preferably provides a small distance between the transmission fringes which can be used as a fine ruler for the precision positioning or orientation of different objects or the measurement(s) thereof. For example, it can be used for the precise translation of samples in electron lithography and in different types of high-resolution microscopes. The non-uniform structure of the fringes allows to precisely determine the width of the waveguide, in particular the absolute distance between mirrors thereof and/or to precisely determine the refractive index of the waveguide. Moreover, the position of the transmission fringes of the interferometer depends on the light wavelength, which allows to use it for spectrum analyzing or measurement of the wavelength of the light and also for separation and/or mixing of different frequency components of light. Moreover, the inventive interferometer works not only with light but also with preferably monochromatic or monoenergetic particle or atomic beams, e.g. with electron, proton and/or neutron beams e.g. for determining their acceleration and/or rotation with respect to the waveguide.

According to a preferred embodiment of the invention, the primary angle $\alpha$ satisfies the following condition:

$$\alpha > arcsin(\lambda/d)$$

wherein d is the width of the waveguide and $\lambda$ is the wavelength of the primary beam, preferably light beam. Accordingly, the minimum possible primary angle $\alpha$ is smaller than the diffractional divergence of the preferably two outgoing (light) beams so that a complete separation of the preferably two outgoing (light) beams is preferably possible.

Preferably, the multimode waveguide comprises two substantially plane mirrors capable of at least partly reflecting the beam, wherein the primary beam, preferably light beam, is (or can be) inputted at a first end face between the mirrors and the secondary beam, preferably light beam, exits the multimode waveguide from between the mirrors at a second end face thereof, wherein the primary angle α preferably satisfies the following condition:

$$\alpha \leq 90°.$$

Further preferably, the interferometer is used for determining an absolute distance between the mirrors, a relative displacement of one mirror being movable with respect to the other mirror, a relative orientation of the two mirrors and/or a refractive index of the medium positioned between the mirrors, and/or used for analysing a spectrum of the primary light beam, wherein the light processing means comprises one or more beam detectors, preferably light detectors. Such light detectors preferably may be single photodiodes, an array of photodiodes or a charged coupled device (CCD).

Still further preferably, the interferometer is used for controlling and/or measuring and/or determining one or more surface properties, preferably flatness of an optical substrate, wherein the optical substrate to be controlled is used as one of the mirrors and the other mirror of the mirrors forms a reference substrate. Accordingly, a minimal observable fringe spacing in the multimode waveguide interferometer can be used to determine or measure or control the flatness of the reflecting surfaces of the multimode waveguide interferometer. Thus, it is in particular possible to detect much smaller deviations of surfaces from the plane than other standard methods such as wedge interferometers having an accuracy of less than λ/10 to λ/20.

According to a further preferred embodiment, the multimode waveguide comprises a dielectric active material having a refractive index which can be varied preferably by applying a specific (predetermined or predeterminable) voltage to a plurality of electrodes and/or a specific (predetermined or predeterminable) magnetic field and/or an additional light field. Such a dielectric waveguide interferometer made of an active optical material can be preferably used to switch the light between the two different output channels. For example, a waveguide may be made of a lithium niobate crystal (LiNbO$_3$) and/or of other nonlinear crystals. Accordingly, in one preferred embodiment it is possible to control or modify the effective refractive index of the multimode waveguide with additional control light pulses or beams. Thus, it is possible to use the interferometer as a switch controlled by or based on the light-induced switching between the fringes of the non-linear multimode waveguide interferometer, the switching time being estimated to be as fast as 10 ps.

Preferably, the primary beam is a primary light beam and the primary angle α satisfies the following condition:

$$\alpha \leq 90° - arcsin(1/n_w)$$

where $n_w$ is the refractive index of the dielectric material, in particular at the specific voltage. For example, for a waveguide made of lithium niobate (LiNbO$_3$) having a refractive index of n=2.15 the maximum angle is preferably 62.3°. Further preferably, the multimode waveguide comprises a planar dielectric material and is provided on or above a surface of a dielectric substrate. For instance, a lithium niobate LiNbO$_3$ crystal may be built on/above a quartz substrate.

Most preferably, the primary angle α satisfies the following condition:

$$\alpha \leq 90° - arcsin(n_s/n_w)$$

where $n_s$ and $n_w$ are the refractive index of the substrate and of the waveguide, respectively. Accordingly, the maximum angle takes into account the critical angle of total reflection. E.g. for a lithium niobate waveguide having $n_w$=2.15 on a glass substrate having $n_s$=1.5 the maximum possible angle is about 46°.

According to a further preferred embodiment of the invention, the multimode waveguide is a one-dimensional multimode waveguide or a waveguide in which the propagation of light is quantized in one dimension while it is not quantized in the other two dimensions. Accordingly, the optical paths can be predicted preferably without the use of numeric calculations or estimations.

Most preferably, the interferometer is used for switching optical signals and/or is used as a wavelength selective cross-connect, wherein the primary beam or wave is a primary light beam and the secondary beam or wave is a secondary light beam, wherein the light processing means comprises two light output means such as optical fibers and wherein a plurality of electrodes is provided on the waveguide to apply a specified (predetermined or predeterminable) voltage.

BRIEF DESCRIPTION OF THE DRAWINGS

These and other objects, features and advantages of the present invention will become apparent upon reading the following detailed description of preferred embodiments and accompanying drawings. It should be understood that even though embodiments are separately described, single features thereof may be combined to additional embodiments.

DESCRIPTION OF THE PREFERRED EMBODIMENTS OF THE INVENTION

Figure 1:
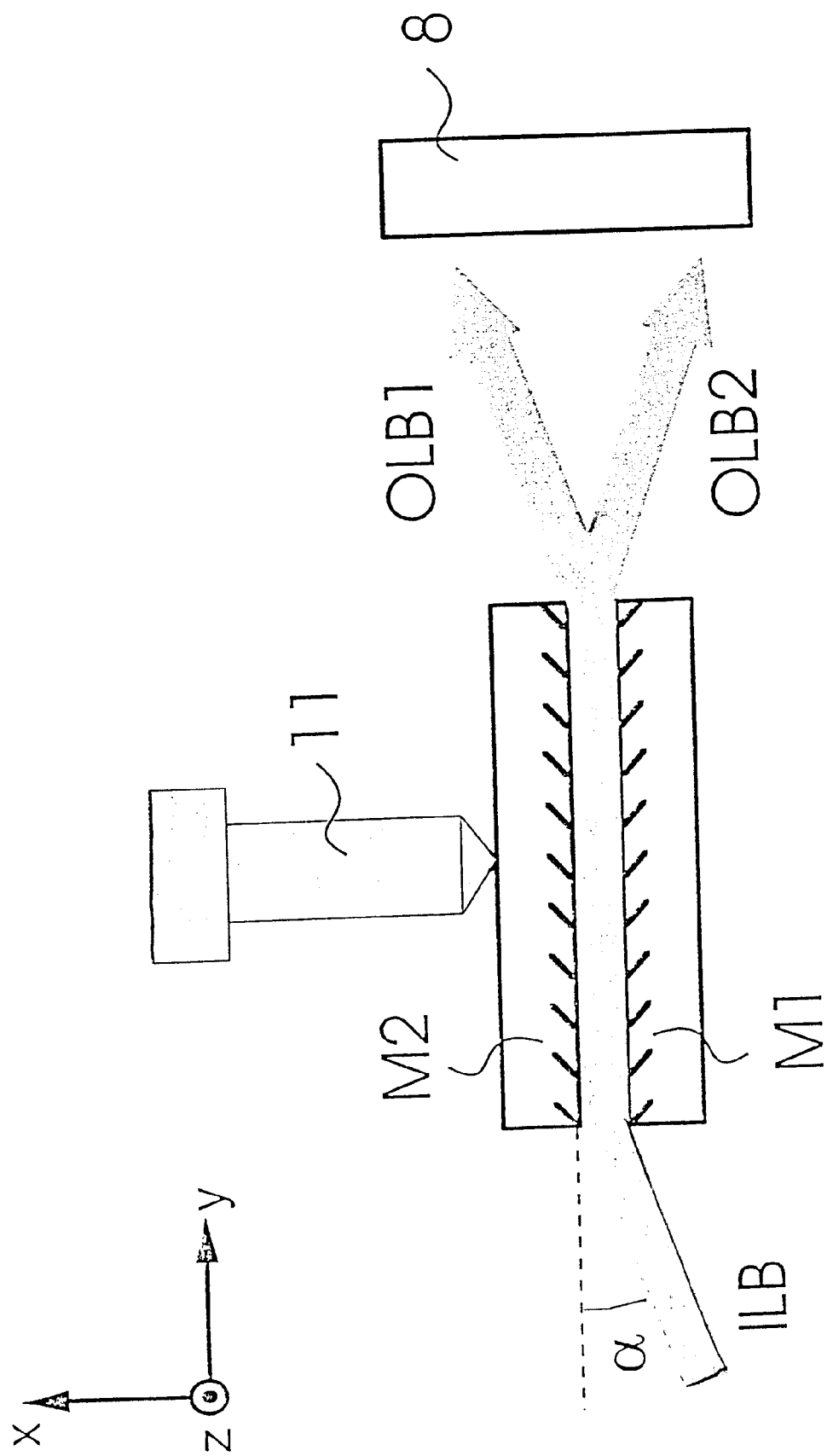
FIG. 1 shows the basic principle of an interferometer according to a preferred embodiment of the invention.
Figure 2:
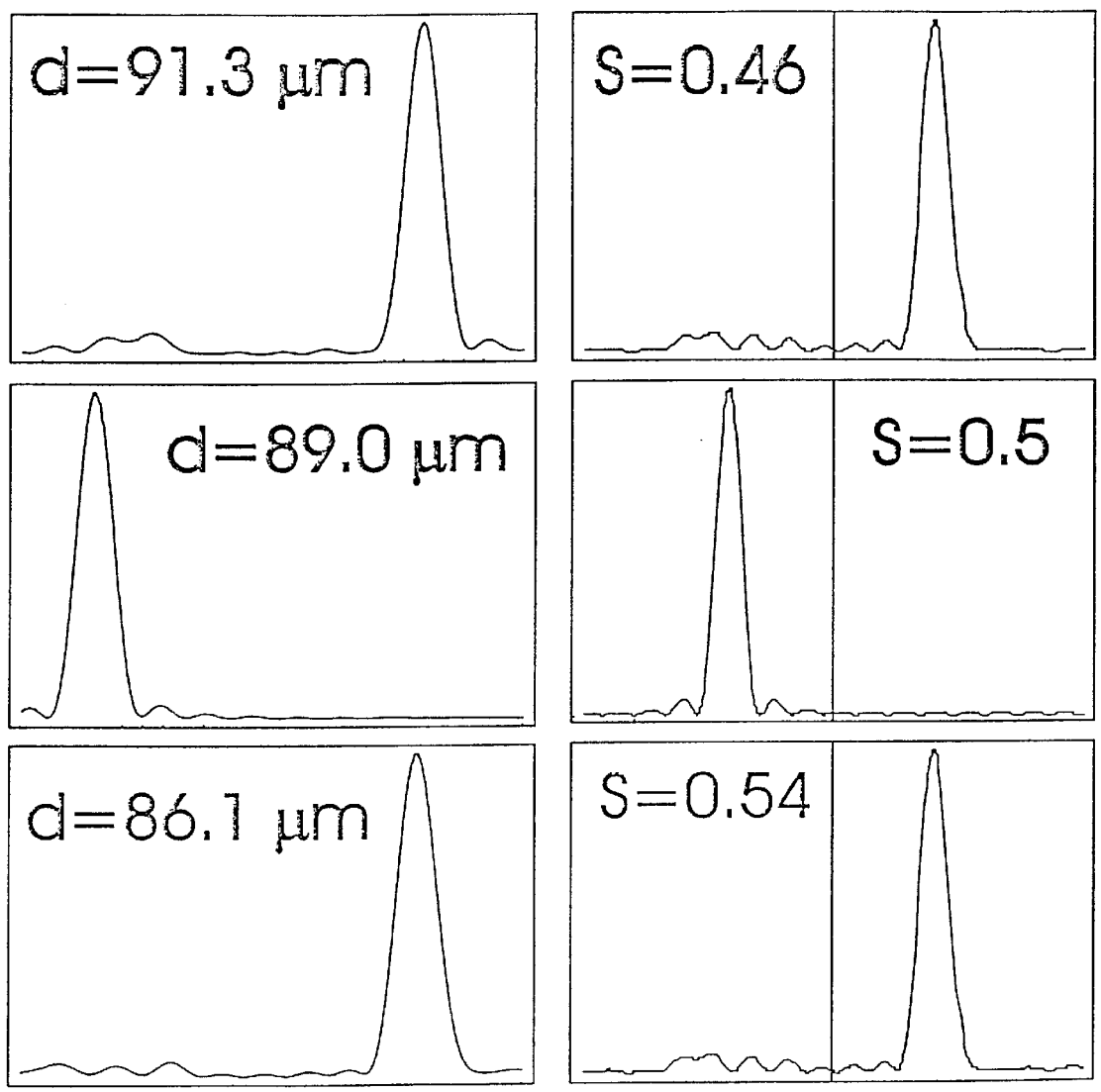
FIG. 2 shows on the left part experimental profiles of the light distributions, i.e. the light intensity distribution versus the position in the detecting device and on the right part a numerically calculated corresponding transverse momentum distribution of light behind the waveguide.

Next, a first preferred embodiment of the invention is described with reference to FIGS. 1 to 4. FIG. 1 shows the basic principle of an interferometer according to this preferred embodiment, which is applied to light beams as preferred primary and secondary beams or waves.

The interferometer comprises a waveguide 1 being formed by two mirrors M1 and M2 capable of at least partly reflecting the primary beam or wave, wherein the mirrors M1 and M2 are preferably made of metal for a primary beam or wave ILB being a primary light beam. The waveguide 1 has two or more modes which can propagate within the waveguide 1, wherein the modes can be high and/or low modes. The mirrors M1 and M2 are arranged in parallel at a distance d. A preferably monochromatic light from a laser enters the waveguide 1 as a primary (light) beam or wave ILB under an angle $\alpha$, i.e. enters the space between the mirrors M1 and M2. Accordingly, unlike standard interferometers, the light does preferably not enter the waveguide through one of the mirrors but at a open side end of the mirrors. In the waveguide 1, the light generates or induces the population of few modes, preferably high modes of the waveguide, which lead to beatings between these modes thus leading to a periodic oscillation or modulation of exiting or outgoing light beams OLB1 and OLB2 leaving the waveguide 1 at the opposite side or side end thereof as secondary light beams. These outgoing light beams OLB1 and OLB2 are then detected and in particular analysed by means of a charged coupled device (CCD) camera 8 as a preferred beam or light processing means. In case the primary beam or wave ILB is formed by a matter beam or wave made of particles (e.g. electrons, protons, neutrons, etc.) or (preferably ionised) atoms the mirrors M1 and M2 may be preferably formed by means of magnetic fields and/or by means of evanescent light wave mirrors. The latter mirrors in particular use the reflection of atomic beams from a gradient of an optical field generated by a laser e.g. using the total internal reflection of a laser beam from a dielectric-vacuum interface. Such a mirror may consist e.g. of a substantially parallel-face plate of fused quartz (e.g. of a thickness of 0,4 mm), which a laser beam enters through a skewed face. By using the multiple total reflection of the laser beam in such plate, an electric field is generated within the dielectric, which substantially decays outside of the dielectric over a distance of about $\lambda/2$ thus having a high gradient. In this electric field, the atoms move like in a potential field and may be reflected or deviated in particular without substantially reaching the surface of the dielectric.

Preferably, the monochromatic light beam enters the multimode waveguide 1 at some large angle $\alpha$. In this case the beam or wave or preferably light experiences not only full and fractional revivals of its initial phase distribution (as described e.g. in Yu. B. Ovchinnikov, Opt. Comm. 182, 35 (2000)), but also additional oscillations of the transverse momentum, related to the beatings between the adjacent, populated transverse modes of the waveguide 1. These oscillations are similar to the Pendellösung oscillations for the Bragg reflection of waves at diffraction gratings (as described e.g. in P. P. Ewald, Ann. Physik 54, 519 (1917)), which were observed in many different systems (refer e.g. to C. G. Shull, Phys. Rev. Lett. 21, 1585 (1968) and to S. Kunze, S Dürr and G. Rempe, Europhys. Lett. 34(5), 343 (1996)). On the other hand, there is no full analogy between Pendellösung oscillations in diffraction gratings and the oscillations of light in a multimode waveguide.

The amplitude of the transverse distribution of the light field at the entrance edge of the waveguide is $E_0(x, 0) = E_0 \exp(-ik \sin(\alpha))$, where $k = \lambda/2\pi$ is the length of the light wavevector and $\lambda$ is the light wavelength. Therefore, the initial distribution has constant amplitude and its phase changes linearly in x direction. The modes propagating along the waveguide have to satisfy the condition of quantization of the transverse component of their wavevector:

$$k \, d \, \sin \alpha_n = n_\pi \quad (1)$$

where n=1, 2, 3 . . . and $\alpha_n$ is the angle of the wavevector in the n-th mode with respect to the boundaries of the waveguide 1. The field amplitude inside the waveguide is determined by $$E(x, y) = \sum_{n=1}^{n^{max}} c_n \sin\left(\frac{n\pi}{d}x\right)\exp\left(-ik\sqrt{1-\left(\frac{n\pi}{kd}\right)^2}\,y\right)\exp(-\gamma_n y) \quad (2)$$

where $\sin(n\pi x/d)$ is the distribution of light in the n-th mode, the next two exponential terms give the phase and losses of the n-th mode along the waveguide and $n^{max}=2d/\lambda$ is a full number of modes in the waveguide 1. The coefficients $C_n$ are given by the projection of the initial distribution $E_0(x, 0)$ onto the modes of the waveguide $$c_n = \frac{2}{d}\int_0^d \sin\left(\frac{n\pi}{d}x\right)E_0(0, x)\,dx \quad (3)$$

The transverse momentum distribution of light coming out of the waveguide 1 can be found by Fourier transform $$E(k_x) \propto \frac{1}{d}\int_0^d E(x, L)\exp(-ik_x x)\,dx \quad (4)$$

of the spatial distribution of the light amplitude at the output edge $E(x, L)$ of the waveguide 1, where L is the length of the waveguide 1 and $k_x$ is the transverse component of the light wavevector.

The waveguide 1 can be formed by two parallel flat mirrors M1 and M2 of substantially equal length (e.g. L=5 cm) and coated with bare gold. The main surfaces of these substrates can be made e.g. of fused silica and polished to a surface roughness or figure of about $\lambda/20$. All degrees of freedom of one of the mirrors M2 is preferably adjustable e.g. by means of a precise mechanical translation stage 11 driven preferably by a "Coherent" Encoder Driver System, which can provide an accuracy of translation of about 0.1 $\mu$m and a total translation in the x-direction of up to 13 mm. However, also a micrometer or a piezo-electric driver may be used.

As a preferred source of light for the incoming light beam ILB one may use a laser, e.g. a He—Ne laser beam with a wavelength of $\lambda=0.633$ $\mu$m and a diameter of about 2 mm. However, it is not indispensable to have a coherent light, as one may use any type of collimated light or beams or waves. In a first series of measurements, the results of which are shown on the left side of FIG. 2, the entrance edge of the waveguide 1, i.e. the gap or slit or clearance between the two mirrors M1 and M2, is illuminated at an angle of $\alpha=0.024$ rad. The linear polarization of the beam or wave was directed parallel to the surfaces of the mirrors M1 and M2 (TE polarization). The resulting space distributions or distributions along a specified (predetermined or predeterminable) direction, which are directly related to the momentum distribution of light at the output edge or side end of the waveguide 1, can be registered by a suitable beam detector such as a CCD camera 8, which is placed e.g. at a distance $D \approx 12$ cm behind the waveguide 1. As far as distance D is much larger than the width d of the waveguide 1, the spatial coordinate $X_{CCD}$ of the light in the plane of the CCD detector 8 is related with the transverse momentum of the light by the simple relation $X_{CCD}=Dk_x/\sqrt{k^2-k^2_x}$. The outgoing light OLB propagates preferably along two directions with angles $\alpha$ and $-\alpha$ thereby forming preferably two outgoing light beams OLB1 and OLB2. However, one of the two light beams OLB1 and OLB2 may also be suitably masked, if needed. At some particular distances between the mirrors $$d_s = \sqrt{\frac{L\lambda}{8s}} \quad (5)$$

where s=M/N is an irreducible ratio and M, N are whole numbers, the effect of full or fractional revivals of the initial light wave front takes place. The number N may be called as an order of the fractional revival resonance (FRR). For N=1, when s is a whole number, the full revivals take place, when the light distribution at the output edge of the waveguide 1 exactly reproduces the initial distribution. Indeed, for these widths of the waveguide 1 it is possible to observe a single light peak with the same transverse momentum $k_x=k \sin(\alpha)$ as in the initial or input light beam ILB (as the primary light beam). In total it is possible to observe e.g. first four full revival resonances for the widths of the waveguide $d_1$=63 $\mu$m, $d_2$=44.5 $\mu$m, $d_3$=36 $\mu$m and $d_4$=31.5 $\mu$m. The outgoing light beam OLB1 at full revival resonances propagates an the angle $\alpha$ with respect to the waveguide 1 and has a diffractional envelope, which is determined by the width of the waveguide 1.

For the fractional resonances of second order, when N=2, the wave front of the input light (ILB) distribution becomes inverted. This produces a single reflected output light beam OLB2, which propagates at angle $-\alpha$ with respect to the waveguide 1. These reflections were observed for $d_{1/2}$=89 $\mu$m, $d_{3/2}$=51.5 $\mu$m, $d_{5/2}$=40 $\mu$m, $d_{7/2}$=33.5 $\mu$m and $d_{9/2}$=29.7 $\mu$m.

It was found that around all of these N=1, 2 main resonances of revivals, when s=½; 1; 3/2; 2 . . . the output light beam OLB experiences periodic oscillations between $\alpha$ and $-\alpha$ directions. The periods of these oscillations is $$\delta d = \frac{2d^2}{L\sin(\alpha)} \quad (6)$$

which can be explained by the beatings between adjacent populated modes of the multimode waveguide 1. Accordingly, it has surprisingly turned out that such arrangement can be used as an interferometer, in particular for the precise measurement of the absolute distance of the two mirrors M1 and M2, of their relative positional and/or orientational position and/or of the refractive index of the space between the two mirrors Ml and M2. Moreover, this interferometer can be used for analyzing beams of particles or atoms.

Calculations show that in the above conditions there are mostly populated only two or three transverse modes of the waveguide 1, which satisfy to the mode matching condition $\alpha_n=\alpha$. The transverse spatial distributions for these oscillations around s=½ resonance of revivals are shown on the left side of FIG. 2. On the right side of FIG. 2 there is shown the corresponding momentum distribution of the outgoing light OLB for the same conditions, which were calculated numerically by using the above formulas (2), (3) and (4).

Instead of a CCD camera 8, it is possible to use a single photodiode to be placed in one of the outgoing light beams OLB1 or OLB2. Of course, two photodiodes may also be used, one in each outgoing light beam OLB1 and OLB2. By changing the distance of the mirrors M1 and M2, e.g. by changing the position of the translational stage 11, it is possible to see a variation of light intensity as a function of the absolute width d of the mirrors M1 and M2 or as a function of the relative displacement of one mirror M1 with respect to the other M2. A corresponding dependency of the light intensity in one outgoing light beam OLB1 is shown as a function of the width d of the waveguide 1 in FIG. 3. In this set of data, the angle $\alpha$ of the incident light beam ILB was set to $\alpha$=0.253 rad. For a large width d of the waveguide 1 (i.e. for d>>$\sqrt{L\lambda}$) the periodic oscillations of the intensity of the reflected outgoing light beam OLB2 and of the transmitted outgoing light beam OLB1 with changing the distance d may be explained by the geometrical propagation of the light beam inside the waveguide 1. Accordingly, the maximum of reflections take place for the widths d of the waveguide 1

$$d_m^{refl} = \frac{L\sin(\alpha)}{2m} \quad (7)$$

where m=1, 2, 3 . . . is the order of the reflection maximum. It is remarkable that the period of these oscillations can be also described with the formula (6). One can see from FIG. 3 that the fringes periodically disappear for the fractional revival resonances of the 4-th order (N=4) for the widths of the waveguide 1: $d_{1/4}$=126 $\mu$m, $d_{3/4}$=73 $\mu$m, $d_{5/4}$=56 $\mu$m, $d_{7/4}$=48 $\mu$m, $d_{9/4}$=42 $\mu$m, $d_{15/4}$=32.5 $\mu$m. At these particular fractional revival resonances (FRR) the outgoing light distribution splits into two equal parts i.e. into two outgoing light beams OLB1 and OLB2 which propagate in $\alpha$ and $-\alpha$ directions and the interference fringes disappear. The fringes re-appear periodically such that they have maximum amplitude near N=1 and N=2 FRR, when s=½; 1; 3/2; 2 . . .

Figure 3:
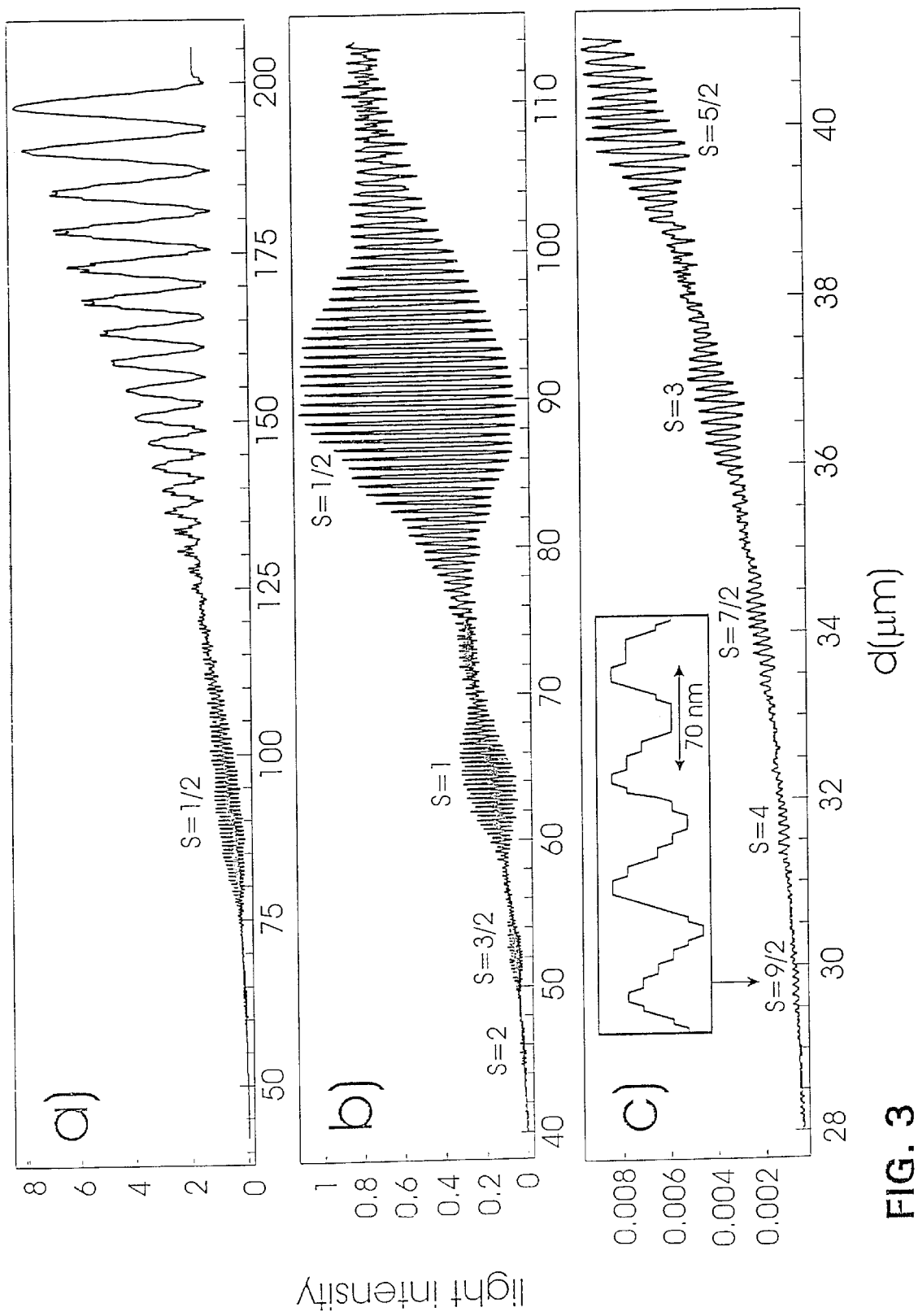
FIG. 3 (a)–(c) show the measured light intensity as a function of the width d (μm) of the waveguide of an interferometer according to a preferred embodiment for different ranges of the width d.

The amplitude of the fringes becomes smaller with decreasing of the width d of the waveguide 1, which can be explained by several reasons. First, by decreasing of the total light power coupled to the waveguide 1. Second, by increasing of the number reflections of the light inside the waveguide 1 and corresponding losses. Third, for smaller width of the waveguide 1 the divergence of the outgoing light beams OLB becomes larger and the number of photons which come or reach into the detector 8 is decreasing. In addition the existence of an additional background was found, which may be explained by the light scattered by non-ideal edges of the mirrors M1 and M2. The position of the high-order fringes, for small widths of the waveguide d<$d_{14}$, is determined only by the position of the resonances of revivals. The period of the fringes is decreasing with decreasing the width d of the waveguide 1 in full accordance with the formula (6). For s=9/2, when d=30 $\mu$m, fringes with period $\delta d$≅70 nm were observed. These fringes are shown in the inset of FIG. 3 (*c*). For such a small period of the fringes the single steps of the Encoder Driver 11, which are of the order of 10 nm, become resolved. According to the formula (5) the position of high-order fringes is also determined by the wavelength of light. Accordingly, it is possible to use the above mentioned setup as an interferometer for analyzing the wavelength of the light or as a light spectrometer.

Figure 4:
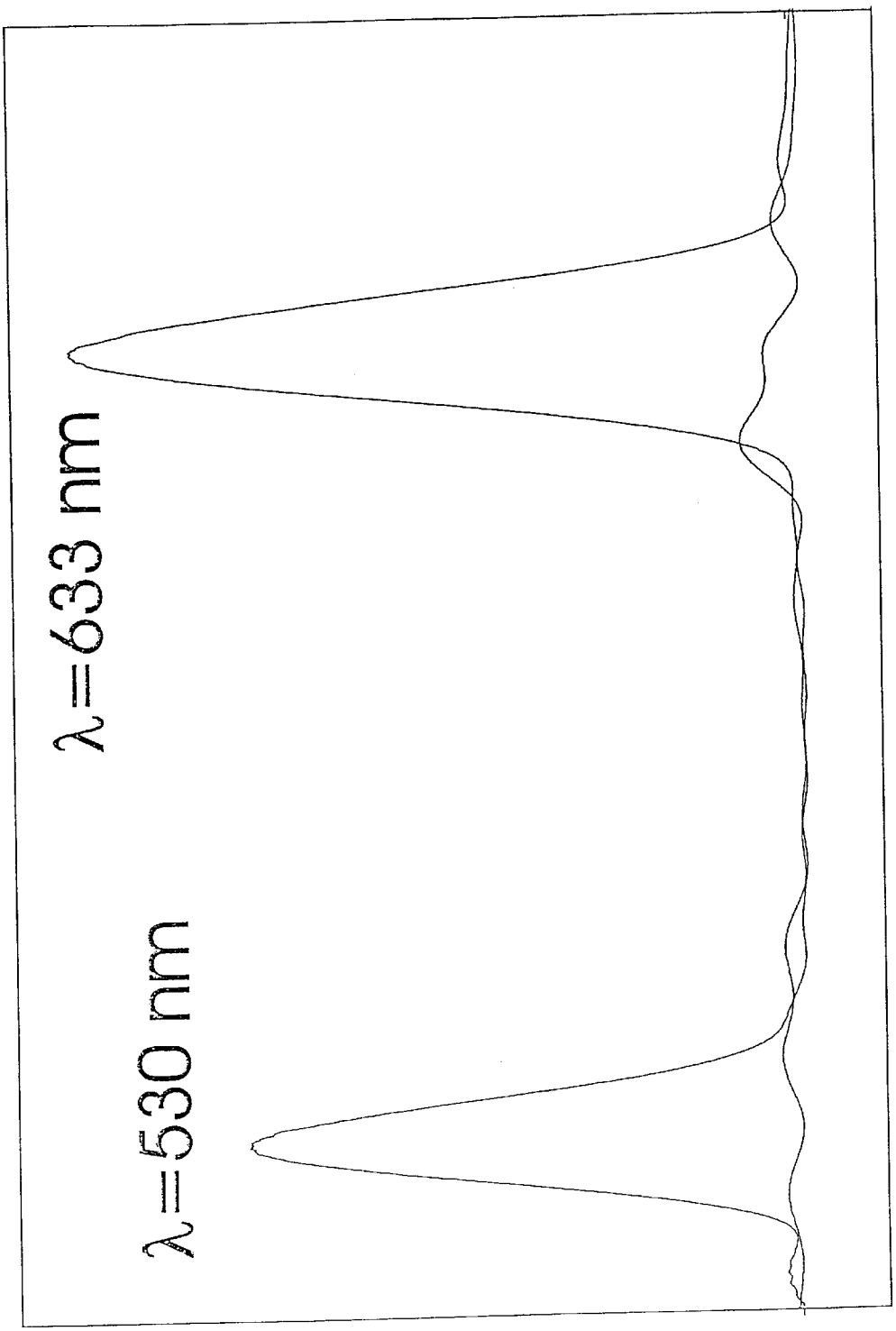
FIG. 4 shows the spatial distribution of light after it has passed the waveguide of an interferometer according to a preferred embodiment of the invention for two different wavelengths $\lambda_1$=633 nm (right profile) and $\mu_2$=530 nm (left profile)

To demonstrate this fact experimentally, the waveguide 1 was illuminated with two co-propagating and well overlapped laser beams of different frequency ($\lambda_1$ =633 nm and $\lambda_2$=532 nm). For the second wavelength $\lambda_2$ a frequency-doubled Nd:Vanadate single-frequency laser was used. The angle of incidence of the incident light beam ILB for both wavelengths was in this case α=0.024 rad. For the large widths d of the waveguide 1 the outgoing light OLB distributions were identical for both frequency components, but for small widths d of the waveguide 1, the fringes were shifted with respect to each other. As an example FIG. 4 shows the spatial distributions for the two frequency components for the width d of the waveguide 1 d=86 μm, which was detected by a CCD camera 8, placed behind the waveguide 1. In this case the red light ($\lambda_1$=633 nm) is almost completely is in the transmitted beam OLB1 and the green light ($\lambda_2$=532 nm) is almost totally reflected by the waveguide 1, i.e. in the reflected outgoing light beam OLB2. Therefore, the two different frequency components are completely separated by the waveguide in momentum and space. Accordingly, it is clear that the above setup can be surprisingly used also as a wavelength dependent beam splitter or switch.

All these observations allow the conclusion, that the above setup with a multimode waveguide can be surprisingly considered as a new kind of an interferometer. The definite advantage of this interferometer, compare to other known types of interferometers, is that the distance between its fringes (5) can be much smaller than λ/2 thus allowing for a much improved resolution in space, wavelength, etc.

Figure 5:
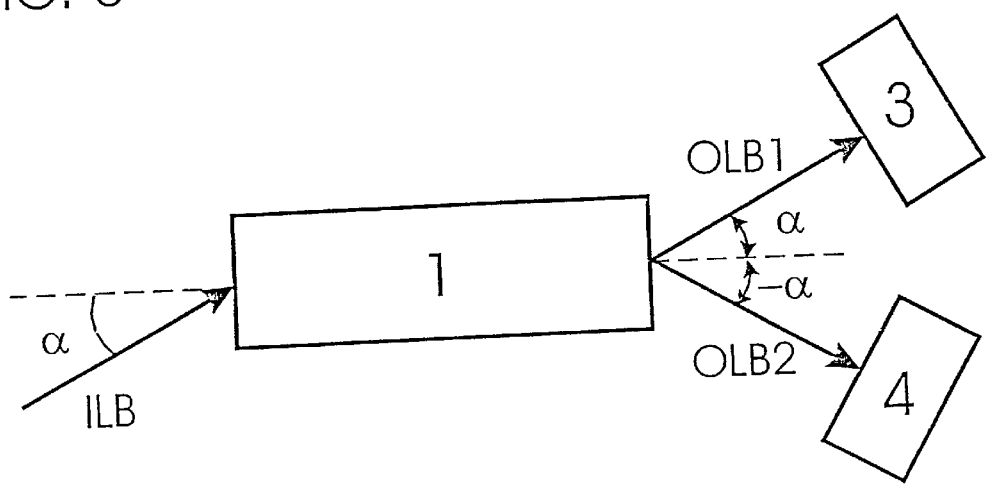
FIG. 5 shows the basic setup of an interferometer according to a further preferred embodiment of the invention.

A further preferred embodiment of the present invention is described with reference to FIG. 5 showing a schematic arrangement of such preferred interferometer or refractometer.

The interferometer comprises a multimode one-dimensional waveguide 1, wherein "one-dimensional" means that the propagation of light is quantized in one dimension while it is not quantized in the other two dimensions. The primary light beam enters the waveguide 1 under a macroscopic angle α and is "split" into two outgoing light beams OLB1 and OLB2, wherein the change of the optical thickness (the physical width d of the waveguide 1 and/or its refractive index) or a wavelength λ of light leads to periodic oscillations of the light intensity in the output light beams OLB1 and OLB2. These periodic oscillations can be explained by the interference between the few populated high modes of the multimode waveguide 1. These interference fringes have a maximum visibility (close to 100%) near the whole and half self-imaging periods of the waveguide 1. Thus, in the waveguide-interferometer the preferably monochromatic light ILB enters the multimode waveguide 1 at some macroscopic angle α, when only a few high modes of the waveguide 1 are populated. The beatings between these modes leads to the periodic oscillations of the intensity in the two light beams OLB1 and OLB2 going out of the waveguide 1 at opposite angles α and −α. For large effective length of the waveguide 1 these interference fringes are very sensitive to small variations of the optical width and length of the waveguide and also to the wavelength of light.

The sensitivity of the interferometer changes with the width d and/or with the refractive index n of the waveguide 1 and is determined by its effective length:

$$s = \frac{L\lambda \cdot n}{8d^2}$$

where d is the width of the waveguide 1, L is the length of the waveguide 1, n is the refractive index of the material of the waveguide and λ is the wavelength of the light in vacuum. In fact, this effective length is just a number of periods of self-imaging (or Talbot) resonances, which take place in the waveguide 1. For example, for a Lithium Niobate waveguide 1 with d=5 μm, L=10 cm, n=2.15 the effective length for λ=1 μm is as large as s=1075.

The minimum angle of incidence α should be preferably larger than the diffractional divergence of the outgoing light beams OLB1 and OLB2, which can be defined as β≅arcsin (λ/d), where d is the width of the waveguide 1. Accordingly, by taking this condition into account, i.e. α>arcsin(λ/d) a complete separation of the outgoing light beams OLB1 and OLB2 is preferably possible yielding the best results in terms of light intensity. For example, for λ=0.63 μm and d=50 μm, ($\alpha_{min}$=0.72° while for λ=0.63 μm and d=5 μm, $\alpha_{min}$=7.2°.

Figure 6:
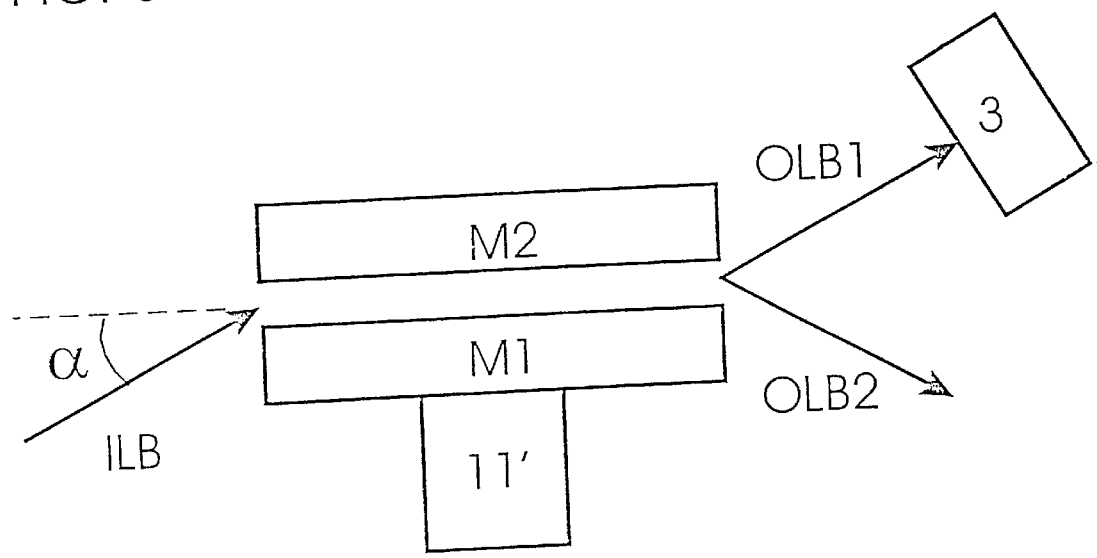
FIG. 6 shows the basic setup of an interferometer according to a still further preferred embodiment of the invention using two mirrors as a multimode waveguide.

FIG. 6 shows a further preferred embodiment of the invention, which is similar to the embodiment shown in FIG. 1. In this preferred embodiment, the waveguide 1 consists of two parallel mirrors M1 and M2 having a high reflectivity. The mirrors M1 and M2 have the substantially same length and sharp edges. The primary light beam ILB enters the interferometer, in particular waveguide 1 through the gap between the mirrors M1 and M2 at some angle α. The intensity of one OLB1 of the output beams Olb1 and OLB2 is detected with a detector 3, such as a photodiode. One M2 of the mirrors M1 and M2 is mounted on a piezoelectric driver 11' and can be moved. The changing the distance d between the mirrors M1 and M2 leads to oscillations of the intensity in the output beams OLB1 and OLB2. The period of these fringes as a function of the displacement of the mirror M2 is approximately is described by the formula δd–d²/L sin(α), where L is the length of the mirrors M1 and M2. Fringes with period 70 nm for the wavelength of light of 633 nm and for d=20 μm were observed. Accordingly, the optical thickness of the waveguide 1 can be simply varied by changing the distance d between the mirrors M1 and M2. The maximum angle $\alpha_{max}$ for the incident or incoming light beam ILB can be as large as 90°.

Alternatively or additionally, the multimode waveguide interferometer according to the preferred embodiment of the invention shown in FIG. 6 can be used for the high-precision control or measurement or detection or testing of one or more substrate surface properties, such as the flatness or surface roughness of an optical substrate, as the minimal observable fringe spacing of the fringes generated in the multimode waveguide interferometer are determined by substrate surface properties, in particular by the flatness or surface roughness of the mirrors M1 and M2 used as reflecting surfaces. For this purpose, the multimode waveguide interferometer comprises two preferably uncoated substrates ("mirror" M1 as a reference substrate preferably having a very high quality of the surface and "mirror" M2 as the substrate to be analyzed). In order to obtain a high reflectivity of the light from the substrates M1 and M2 it is advantageous to fill the space between the substrates M1 and M2 with a liquid having a higher index of refraction as the substrates M1 and M2 such as an immersion oil. The output light beam OLB1 is the detected or measured by the detector 3 in order to determine the fringes of the interference pattern as a function of the distance between the substrates M1 and M2. It is the possible to deduce or determine the surface roughness or flatness or quality of the substrate M2 from the minimum distance between the substrates M1 and M2 for which the fringes are still visible. Accordingly, it is possible to detect much smaller deviations of surfaces from the plane than other standard methods such as wedge interferometers having an accuracy of less than μ/10 to μ/20.

Figure 7:
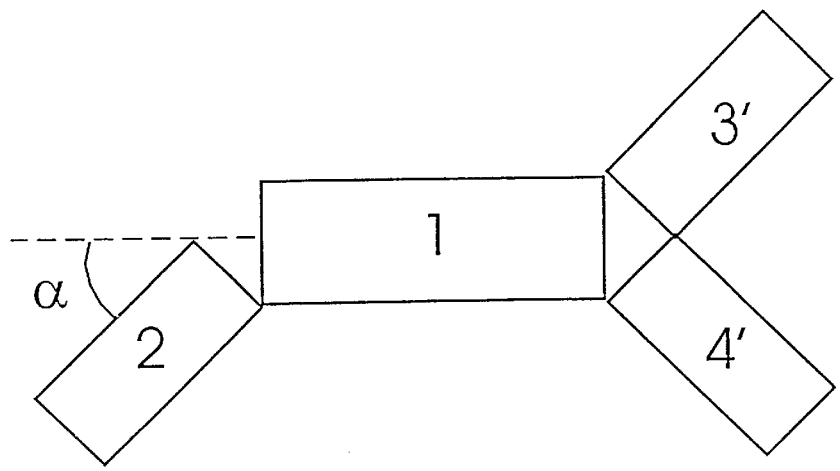
FIG. 7 shows the basic setup of an interferometer according to a still further preferred embodiment of the invention which can be used as a wavelength selective cross-connect.

FIG. 7 shows a further preferred embodiment of the invention, in which the interferometer is preferably used as a selective cross-connect based on the waveguide interferometer.

A bi- or multichromatic light beam enters enters the interferometer, in particular the waveguide 1 by means on an optical fiber 2 as a light input means at an angle $\alpha$. At least two separated wavelengths come out of the waveguide 1 under different angles $\alpha$ and $-\alpha$ and are inputted into optical fibers 3' and 4' as light processing means. In other words, the geometrical position of the fringes within the waveguide interferometer depends on the wavelength of the inputted light beam ILB so that it can be used as a wavelength selective cross connect.

In this interferometer, the maximum angle of the propagating mode should not exceed the critical angle of total reflection $\gamma = 90° - \arcsin(1/n)$, where n is the refraction index of the dielectric medium of the waveguide 1. Without taking into account the possible changes of the angle due to the coupling of light to the waveguide 1, the maximum angle of entrance $\alpha_{max}$ is limited to $\gamma$. For example, for a dielectric waveguide made of lithium niobate $LiNbO_3$ $_{(n=2.15)}$ the maximum angle is $\alpha_{max} \cong -62.3°$.

Figure 8:
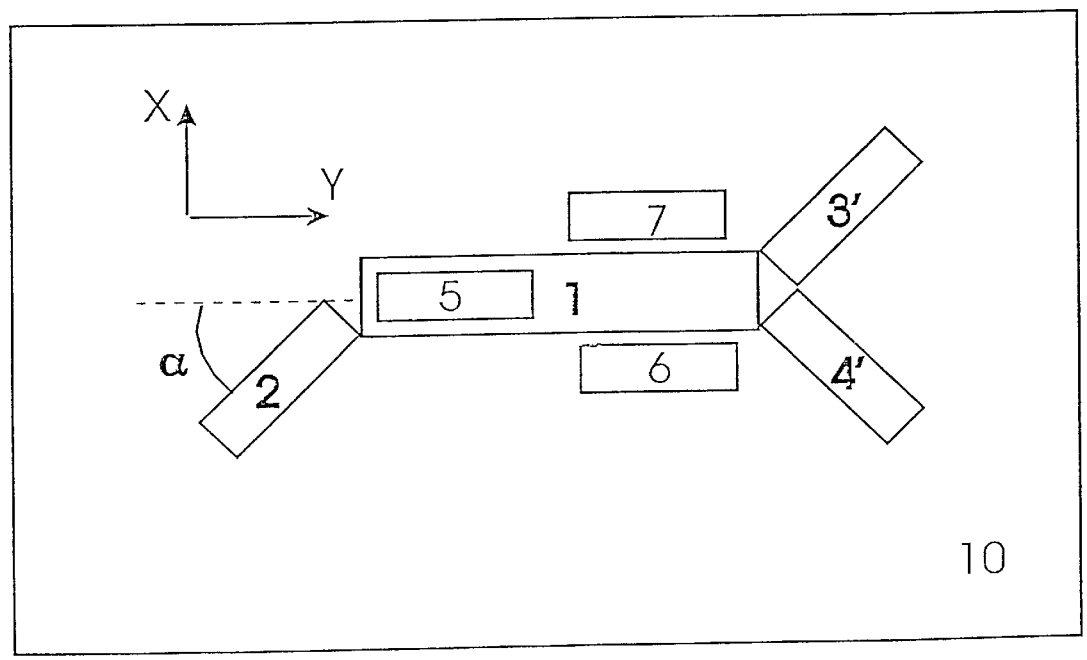
FIG. 8 shows the basic setup of an interferometer according to a further preferred embodiment of the invention which can be used as an integrated fast switch for optical signals.

A further preferred embodiment of the invention is shown in FIG. 8, where the interferometer is used as a (fast) switch for optical signals. In this interferometer, a lithium niobate $LiNbO_3$ crystal is used as a nonlinear crystal for the waveguide 1. The waveguide 1 may be preferably built on a quarz substrate 10, wherein the orientation of the axis of the crystal is not important as far as its birefringence is not used. The light enters the crystal 1 at an angle $\alpha$ through another waveguide 2' as a preferred light input means. By applying a voltage to a plurality of electrodes 6–7 the outgoing light beam can be rapidly switched between the waveguides 3' and 4' as preferred light processing means. Preferably, two pairs of electrodes are used, which produce two fields being preferably orthogonal in two halves of the crystal to advantageously compensate its birefringence. Further preferably, the crystal should have a substantially rectangular cross section. The transverse size or cross section is e.g. $5 \times 5$ $\mu m^2$ and its length is e.g. 10 cm. With other nonlinear crystals, which have a higher non-linearity, the length of the switch can be smaller, if desired.

For a planar dielectric waveguide 1 on a surface of a dielectric substrate 10, the maximum angle $\alpha_{max}$ possible for the impinging light beam ILB is determined by the critical angle of total reflection $\gamma \cong 90° - \arcsin(n_S/n_W)$, where $n_S$ and $n_W$ are the refractive index of the substrate 10 and of the waveguide 1, respectively. For example, for the lithium niobate waveguide with $n_W = 2.15$ on a glass substrate $n_s = 1.5$ the maximum angle is $\alpha_{max} \cong 46°$. In particular, the impinging light beam ILB may lie in the plane XOY of the quartz substrate 10, as shown in FIG. 8. The advantage of such configuration is that the input waveguide or optical fiber 2, through which the impinging light beam ILB is inputted into the waveguide 1, can be produced on the same substrate 10, so that e.g. the lithium niobate waveguide 1 can be built on or above the surface of the same substrate 10. Accordingly, the light propagating in the waveguide 1 at the angle $\alpha$ is reflected at the waveguide/air interface between the waveguide 1 and the surrounding air, wherein the critical angle is thus defined by $90° - \arcsin(1/n_W)$, where $n_w$ is the refractive index of the dielectric material, in particular at the specific voltage. For example, for a waveguide made of lithium niobate ($LiNbO_3$) having a refractive index of n=2.15 the critical angle is preferably 62.3°. However, the impinging light beam ILB may lie in the plane YOZ, i.e. in a plane perpendicular to the plane of the substrate 10. The advantage of this configuration thus would be that the waveguide 1 may be formed by a thin layer (e.g. of about 5 $\mu m$) e.g. of lithium niobate. However, in this case the waveguide for the impinging light beam ILB cannot be placed on the same substrate 10. In this case, the propagating light is reflected at the waveguide/substrate interface so that the critical angle is defined by $90° - \arcsin(n_S/n_W)$, where $n_S$ and $n_W$ are the refractive index of the substrate and of the waveguide, respectively. E.g. for a lithium niobidate waveguide having $n_W = 2.15$ on a glass substrate having $n_S = 1.5$ the critical angle is about 46°. Nevertheless, if there are some metal electrodes between the waveguide 1 and the substrate 10 and on the surface of the waveguide, the maximum possible angle of the impinging light beam ILB may reach 90° like in the embodiment using metal mirrors.

In this interferometer, the maximum angle of the propagating mode should not exceed the critical angle of total reflection $\gamma = 90° - \arcsin(1/n)$, where n is the refraction index of the dielectric medium of the waveguide 1. Without taking into account the possible changes of the angle due to the coupling of light to the waveguide 1, the maximum angle of entrance $\alpha_{max}$ is limited to $\gamma$. For example, for a dielectric waveguide made of lithium niobate $LiNbO_3(n=2.15)$ the maximum angle is $\alpha_{max} \cong 62.3°$.

Accordingly, this switch does not need to use the birefringence effect of the non-linear crystal, which are sensitive to the polarisation of the incident light, but uses the change of total refractive index of the medium or waveguide 1. However, if needed the birefringence effect may be additionally used.

Instead of the solid state crystal a similar switch can use liquid crystals, which have a much higher non-linearity. Basically, the setup is similar as that shown in FIG. 8, where reference 1 then denotes a liquid crystal as a preferred waveguide 1. The advantage of such liquid crystal switch is that it can be very small due to its higher non-linearity and also that it is not sensitive to the polarisation of the impinging light. On the other hand, however, such a switch is not as fast as a solid state crystal switch.

The above waveguide-interferometers thus provide a small distance between the transmission fringes, which can be used as a fine ruler for the precision positioning of different objects. For example, it can be used for the precise translation of samples in electron lithography and in different types of high-resolution microscopes. The non-uniform structure of the fringes allows precisely to determine the absolute distance d between the mirrors M1 and M2 used as a preferred waveguide 1 of the interferometer. Furthermore, the position of the transmission fringes of the interferometer depends on the light wavelength, which allows to use it for spectrum analyzing and also for separation and mixing of different frequency components of light. In case the waveguide 1 is made of an active optical material, the interferometer can be can be used as a switch to switch the light between the two different output channels. Moreover, in case the primary beam or wave is a beam or wave made of particles or atoms, such interferometer can be used to analyze the properties of the primary beam, such as the acceleration and/or the rotation with respect to the waveguide, at a very high precision.

Figure 9:
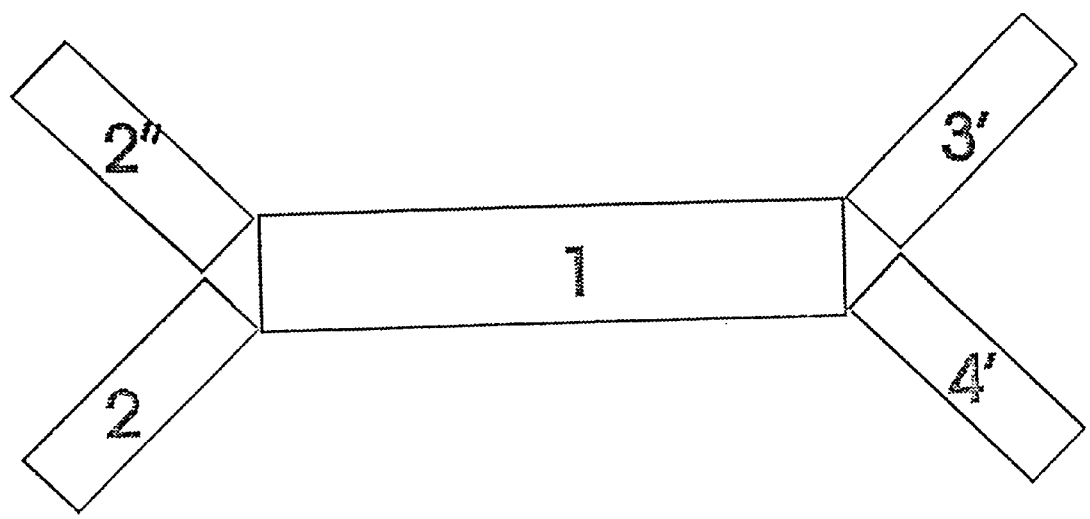
FIG. 9 shows the basic setup of an interferometer according to a further preferred embodiment of the invention which can be used for as a switch.

In FIG. 9 there is shown the basic setup of an interferometer according to a further preferred embodiment of the invention which can be used as switch for switching an output light beam between two output or processing means 3' and 4'.

A preferably monochromatic light beam enters the interferometer, in particular the waveguide 1 by means on an optical fiber 2 as a preferred light input means at an angle $\alpha$. The multimode waveguide 1 is preferably made of a Kerr nonlinear dielectric material (i.e. a material which changes its optical properties, in particular its birefractive index by the application of an electric field according to the Kerr-effect). Depending on the refractive index of the waveguide 1 the outcoming light beam exits the waveguide 1 under different angles α and −α and can be inputted into one of the optical fibers 3' and 4' as preferred light processing means. By means of an optical fiber 2" as preferred control beam input means a control light beam is inputted into the waveguide 1. This control light beam being preferably pulsed and/or intense changes the refractive index of the waveguide 1 therefore allowing for a switching or cross-connecting of the light signal between the two beam processing means 3' and 4'. In other words, by applying a control light signal to the optical fiber 2" it is possible to have a secondary beam OLB either in the optical fiber 3' or in the optical fiber 4'. The switching times are estimated to be as fast as 10 ps. It is also conceivable to input a bi- or multichromatic light beam into the interferometer, in particular the waveguide 1 by means on an optical fiber 2 as a light input means at an angle α. At least two separated wavelengths come out of the waveguide 1 under different angles α and −α and are inputted into optical fibers 3' and 4' as light processing means. Then, depending on the control light beam or signal inputted into the optical fiber 2" it is possible to vary the wavelength selective cross connect properties of the waveguide 1 (as described with respect to FIG. 7).

What is claimed is:

1. An interferometer comprising:
   at least one multimode waveguide,
   beam input means for inputting a primary beam at a specified primary angle α into the multimode waveguide so as to generate an interference between at least two populated modes of the multimode waveguide,
   at least one beam processing means for processing at least one secondary beam exiting the multimode waveguide, and,
   wherein the primary angle α satisfies the following condition:

$$\alpha > \arcsin(\lambda/d)$$

wherein d is a width of the waveguide and λ is a wavelength of the primary beam.

2. An interferometer according to claim 1, wherein the multimode waveguide comprises a dielectric active material having a refractive index which can be varied.

3. An interferometer according to claim 2, wherein the primary beam is a primary light beam, and wherein the primary angle α satisfies the following condition:

$$\alpha \leq 90° - \arcsin(1/n_w).$$

4. An interferometer according to claim 2, wherein the multimode waveguide comprises a planar dielectric material and is provided on a surface of a dielectric substrate.

5. An interferometer according to claim 4, wherein the primary beam is a primary light beam, and wherein the primary angle satisfies the following condition:

$$\alpha \leq 90° \arcsin(n_s/n_w)$$

where $n_s$ and $n_w$ are a refractive index of the substrate and of the waveguide, respectively.

6. An interferometer according to claim 4, wherein the multimode waveguide is a one-dimensional multimode waveguide.

7. An interferometer according to claim 4
   wherein the primary beam is a primary light beam and the secondary beam is a secondary light beam,
   wherein the light processing means comprises two light output means and
   wherein a plurality of electrodes are provided on the waveguide to apply a voltage.

8. An interferometer according to claim
   wherein the primary beam is a primary light beam and the secondary beam is a secondary light beam,
   wherein the light processing means comprises two light output means and
   wherein a control light beam is inputted through a control beam input means for changing a refractive index of the multimode waveguide.

9. An interferometer according to claim 2, wherein the refractive index is varied by at least one of a voltage applied to a plurality of electrodes, an applied magnetic field and incident additional light.

10. An interferometer comprising:
    at least one multimode waveguide,
    beam input means for inputting a primary beam at a specified primary angle α into the multimode waveguide so as to generate an interference between at least two populated modes of the multimode waveguide,
    at least one beam processing means for processing at least one secondary beam exiting the multimode waveguide; and,
    wherein the multimode waveguide comprises two substantially plane mirrors for at least partly reflecting a beam, wherein the primary beam is inputted at a first end face between the mirrors and the secondary beam exits the multimode waveguide from between the mirrors at a second end face thereof.

11. An interferometer according to claim 10, wherein the interferometer is sensitive to at least one of an absolute distance between the mirrors, a relative displacement of one of the mirrors that is movable with respect to the other mirror, a relative orientation of the two mirrors, a refractive index of a medium positioned between the mirrors, and a spectrum of the primary beam, and,
    wherein the beam processing means comprises at least one detector.

12. An interferometer according to claim 10, wherein the interferometer is responsive to a property of a surface of an optical substrate, wherein an optical substrate to be controlled is used as one of the mirrors and the other one of the mirrors forms a reference substrate.

13. An interferometer according to claim 10, wherein the multimode waveguide comprises a dielectric active material having a refractive index which can be varied.

14. An interferometer according to claim 13, wherein the primary beam is a primary light beam, and wherein the primary angle α satisfies the following condition:

$$\alpha \leq 90° - \arcsin(1/n_w).$$

15. An interferometer according to claim 13, wherein the multimode waveguide comprises a planar dielectric material and is provided on a surface of a dielectric substrate.

16. An interferometer according to claim 15, wherein the primary beam is a primary light beam, and wherein the primary angle satisfies the following condition:

$$\alpha \leq 90° - \arcsin(n_s/n_w)$$

where $n_s$ and $n_w$ are a refractive index of the substrate and of the waveguide, respectively.

17. An interferometer according to claim 15, wherein the multimode waveguide is a one-dimensional multimode waveguide.

18. An interferometer according to claim 15,
   wherein the primary beam is a primary light beam and the secondary beam is a secondary light beam,
   wherein the light processing means comprises two light output means and
   wherein a plurality of electrodes are provided on the waveguide to apply a voltage.

19. An interferometer according to claim 15
   wherein the primary beam is a primary light beam and the secondary beam is a secondary light beam,
   wherein the light processing means comprises two light output means and
   wherein a control light beam is inputted through a control beam input means for changing a refractive index of the multimode waveguide.

20. An interferometer according to claim 10, wherein the primary angle α satisfies the following condition:

$$\alpha \leq 90°.$$

21. An interferometer according to claim 11, wherein the detector is responsive to incident light.

22. An interferometer according to claim 11, wherein the detector is responsive to a beam.

23. An interferometer according to claim 13, wherein the refractive index is varied by at least one of a voltage applied to a plurality of electrodes, an applied magnetic field and incident additional light.

* * * * *